United States Patent [19]

Surman

[11] Patent Number: 4,512,214
[45] Date of Patent: Apr. 23, 1985

[54] STATION LOCKING ROTARY INDEXING TABLE

[76] Inventor: William K. Surman, 10 Greenbriar Rd., Green Brook, N.J. 08812

[21] Appl. No.: 533,346

[22] Filed: Sep. 19, 1983

[51] Int. Cl.³ ............................................ B23Q 17/00
[52] U.S. Cl. ...................................... 74/820; 74/436; 74/822
[58] Field of Search .............. 74/820, 822, 436, 813 L

[56] References Cited

U.S. PATENT DOCUMENTS

| | | | |
|---|---|---|---|
| 2,934,970 | 5/1960 | Parstorfer | 74/436 |
| 3,385,137 | 5/1968 | Barden | 74/822 |
| 3,546,958 | 12/1970 | Parks | 74/436 |

Primary Examiner—Kenneth J. Dorner
Attorney, Agent, or Firm—Richard S. Roberts

[57] ABSTRACT

Provided is a rotary indexing table comprising a circular plate having a peripheral race mounted to a base. A notched Geneva disk is provided with a plurality of cam followers which ride in the plate race. Between the plate and the disk is a dual slotted slide capable of periodically engaging at least one and preferably two of said cam followers to provide work station locking. Rotary means is also provided which bears a crescent shaped second cam follower lock and also a needle bearing cam follower member which is slidable in a second slot in said slide, said needle bearing cam follower sequentially engages and disengages said notches to effect Geneva disk rotation and also causes slide translation.

17 Claims, 4 Drawing Figures

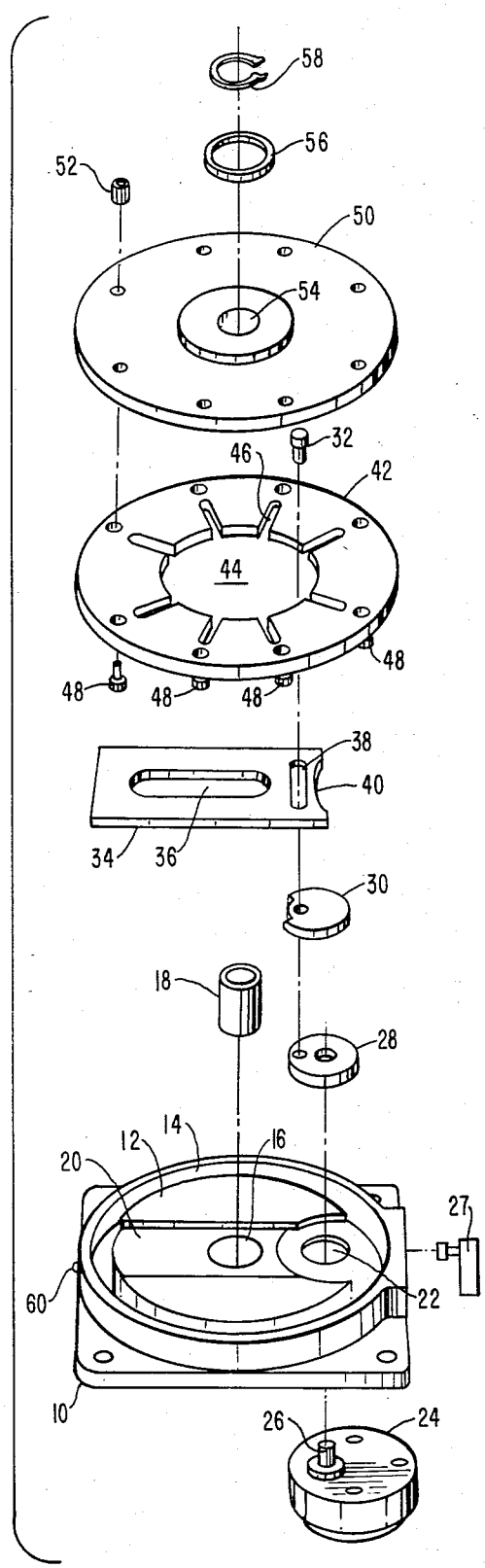
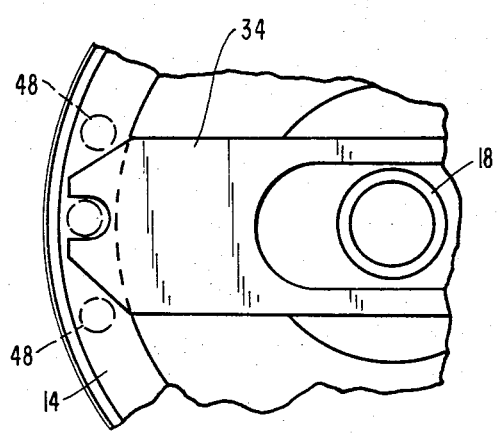
FIG. 1
FIG. 4

STATION LOCKING ROTARY INDEXING TABLE

BACKGROUND OF THE INVENTION

The present invention relates to a rotary table capable of indexing work stations thereon. More particularly, the invention provides a mechanism useful for stepwise incremental advancement of a turntable whereby sequential portions of the table top may be presented to appropriate tooling so that work functions may be performed.

It is well known to the skilled artisan to provide rotary mechanisms for the smooth rotary advancement of machine parts. Such devices are known as Geneva mechanisms. The usual Geneva mechanism provides a slotted plate attached to a shaft which has a plurality of slots which are successively engaged by an eccentrically mounted projecting pin secured on the edge of a drive wheel attached to a rotating member. As the driver rotates, the pin revolves and enters one of the slots and pushes the slotted plate to its next position, at which point the pin exits the slot and prepares its positioning to enter the next sequential slot. Such Geneva mechanisms are commonly employed with machine tools and indexing speed may be controlled directly by affecting driver speed.

Many types of indexing arrangements have been known in the art. U.S. Pat. No. 3,301,097 employs one example of Geneva operation. This disclosure indexes in the classic Geneva manner and the station is then locked by axial shifting caused by fluid pressure. U.S. Pat. No. 3,279,281 incrementally advances machine components wherein the drive wheel may be locked in position by activation or retraction of a drive pin. Drive is aperiodic and is actuated by a demand feed signal which is electro-magnetically controlled. Rotary motion is imparted indirectly via a drive train. U.S. Pat. No. 1,347,492 describes a use for Geneva drives in book binding production.

This disclosure employs a particular type of turn wheel having both slotted and arcuate portions whereby dwell and drive time may be more effectively controlled for this specific application. U.S. Pat. No. 2,106,109 shows a chain driven device for intermittent circular movement and provides stationary guides at the entrance and departure stations for smooth starting and stopping movement.

U.S. Pat. No. 2,049,690 provides a gear driven clutch which is controlled by external current impulses. It is taught to be useful for accumulators in calculating machines. The gears are loosely mounted on their shafts. U.S. Pat. No. 3,478,616 provides a Geneva apparatus having slotted drive and arcuate relief on the wheel. The power drive is disengaged at the midpoint of the dwell position. U.S. Pat. No. 3,093,014 provides a ratcheting indexing device. U.S. Pat. No. 3,153,952 provides an indexing mechanism where a driving means turns a Geneva wheel. A locking means which is movable along the drive axis engages the plate member. U.S. Pat. No. 1,045,102 provides a gear driven cam follower which drives a Geneva wheel. U.S. Pat. No. 2,124,213 provides intermittent gearing for Geneva drives having a lock engaged during non-driving periods. The lock eccentrically revolves around an axis parallel to the driven axis and periodically engages the driven member. U.S. Pat. No. 2,358,503 provides a turret indexing mechanism for lathes employing socket and plunger type operation.

From the foregoing discussion it is clear that various configurations of Geneva wheel indexing have been heretofore employed. In some operations it is not necessary to lock-in each position. However, it is quite apparent that for machine tool cooperation uses, it is a distinct advantage to lock the turning wheel firmly at each work station. Some of the foregoing disclosures loosely lock the work station position by means of the station turning pin itself or by use of an eccentric on the drive means axis. In contradistinction, the present invention provides a slotted, driven slide which positively blocks work station movement during dwell times.

SUMMARY OF THE INVENTION

The present invention provides an improved work station indexing table whereby the mechanism is firmly locked during dwell time at a station.

Specifically, the invention provides a rotary indexing table which comprises a mounting base having an upper face defining a stationary plate, said plate having a central hub therethrough and a recessed channel positioned at the upper face of said plate around its circumference said plate further having a slide groove adapted for sliding engagement with a slide element, and further having a bore capable of cooperation with rotating means, a drive disk positioned over said plate, said disk having a central orifice therethrough and a plurality of notches radiating from said orifice and extending a distance spaced from the periphery thereof, a plurality of cam followers mounted at the underside of said disk, said cam followers being positioned and capable of translation in said plate channel; a slide element positioned in the slide groove of said plate, said slide having a first slot therethrough parallel to its longitudinal axis and adapted to slide with said hub positioned therethrough, a first end of said slide positioned for periodic locking engagement and disengagement with at least one of said cam followers, a second slot through said slide positioned at a second end thereof perpendicular to and spaced from said first slot; rotating means comprising a rotating shaft mounted through said plate bore, a rotor member mounted for rotation by said shaft; a needle bearing, cam follower, or projecting pin adapted for eccentric revolution around said shaft, said needle bearing being positioned for translation in said second slot of said slide and capable of sequentially engaging and disengaging adjacent disk notches to effect disk rotation about said hub.

The mechanism features exceptional smoothness from position to position via an arrangement which is always mechanically engaged. That is, the upper table surface is not ordinarily manually movable.

DESCRIPTION OF THE DRAWINGS

FIG. 1 shows an exploded view of the rotary indexing table of the present invention.

FIG. 4 shows a slide element which clutches a single cam follower.

DETAILED DESCRIPTION OF THE PREFERRED EMBODIMENT

Figure 2:
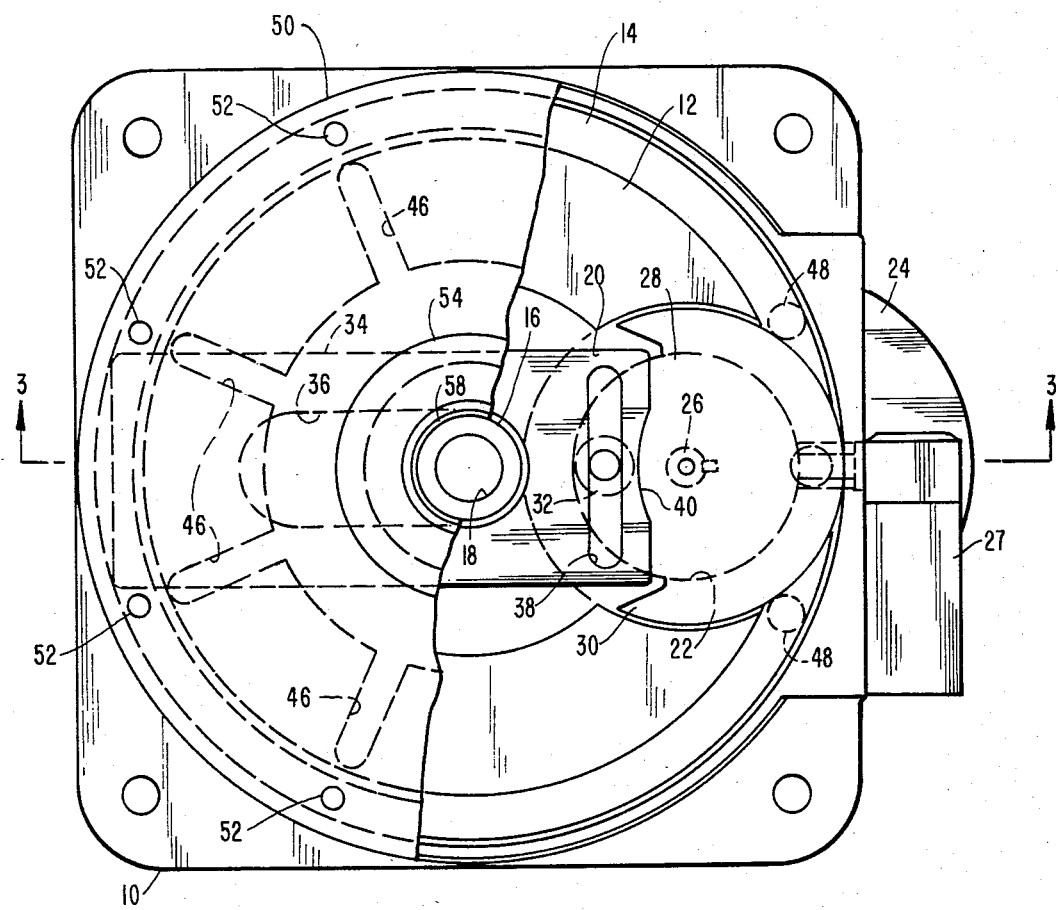
FIG. 2 shows a partial cut-away top plan view thereof.
Figure 3:
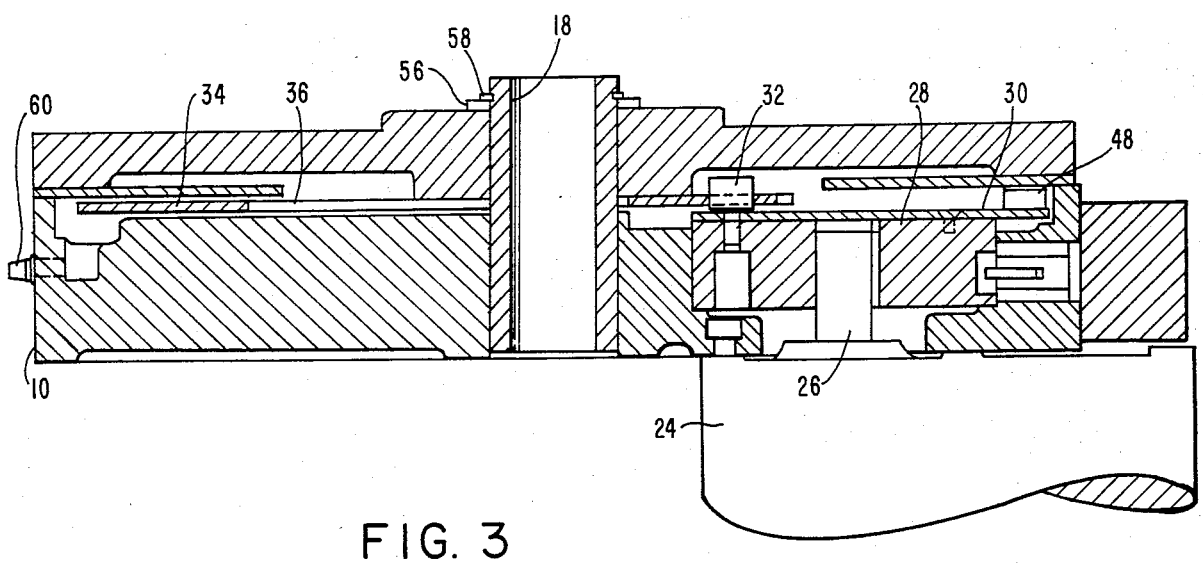
FIG. 3 shows a side cross-sectional view thereof.

As hereinbefore mentioned, the invention provides an improved rotary indexing table useful for sequential work station advancement and locking. FIGS. 1–3 exemplify the preferred embodiment of the invention. Provided is a base support 10 which has a generally circular stationary plate 12 on its upper face. Around the periphery of the plate is circular race groove 14 which is positioned slightly inwardly from the outermost plate edge. The plate has a central hole 16 which is adapted to receive pipe-like hub portion 18. Cut across the center of the plate is a relatively wide slide groove 20 which is adapted to cooperate with a slide element as hereinafter described. At one end of the slide groove is a hole 22 which is positioned for having motor 24 bearing shaft 26 inserted therethrough. The motor may be controlled by switch 27 which is connected to a power supply, not shown. The switch may also function to indicate the position of the table. A preferred motor is model GM 05012-005/022 available from PMI Motors/Kollmorgen Corp. A preferred switch is a class 9007 Limit Switch available from Square-D. Attached to said shaft and positioned within hole 22 is rotor support 28 which bears crescent shaped rotor 30 and an eccentrically mounted protruding pin member 32 which is preferably a revolvable needle bearing type cam follower. Positioned in groove 20 is slide element 34. Said slide 34 is generally rectangular in shape and has a first central oblong slot 36 in its center parallel to the longitudinal axis of the slide. Spaced from and perpendicular to slot 36 is a second slot 38 adapted to receive needle bearing cam follower 32. The slide perferably also has a concave notch 40 at one end thereof to avoid interference with cam followers 48. Positioned over the slide is Geneva drive disk 42. The drive disk has a central orifice 44 and a plurality of perferably equi-spaced notches 46 radiating from the orifice and extending a distance toward the periphery of the disk. At the underside of the disk is a plurality of members 48 which may be projecting pins, needle bearings or preferably rotatable cam followers which are perferably positioned between the notch ends and the periphery and are set to rotate within race 14. In the perferred embodiment the disk is covered with table top element 50 which may be connected to disk 42 by allen nuts 52 attached to the cam followers 48. In practice, hub 18 passes throught hole 16, slot 36 orifice 44 and table top center 54 and fastens the entire assembly together by suitable means such as thrust washer 56 and retaining ring 58. Cam follower 32 which is eccentrically attached to rotor support 28 and rotor 30, passes through slide slot 38, and sequentially engages one of the disk notches 46. Therefore, as rotor support 28 revolves, the connected cam follower 32 pulls and pushes slide 34 within groove 20. It also engages one notch 46, and turns the drive disk 42 one index increment before disengaging said notch thus turning disk 42. When the slide 34 is in its fully extended, i.e. in the leftwardmost position, it is set between two cam followers 48 thus positively locking the drive disk and preventing table rotation. When the rounded portion of rotor 30 is also positioned between two other cam followers 48 added locking protection is provided.

The preferred assembled construction provides shaft 26 attached to rotor support 28 which is positioned in hole 22. The rotor support bears rotor 30 and cam follower 32. In another preferred embodiment rotor support 28 and rotor 30 may be integral with one another. Hub 18 is centered in hole 16. Slide 34 is positioned in groove 20 such that hub 18 protrudes upwardly through slot 36 and cam follower 32 rides in slot 38.

Table top 50 is attached to drive disk 42 preferably via nuts 52 and rotary cam followers 48. The disk 42/table top 50 combination is then placed on plate 12 such that hub 18 passes through orifice 44 and hole 54 and the cam followers 48 are placed for revolution within race 14. The assembly is then locked together by a thrust washer and retaining ring.

In the preferred mode of operation, an EMF is transmitted to D.C. motor 24. This action rotates shaft 26, rotor support 28, rotor 30 and eccentric cam follower 32. Rotation can be clockwise or counter-clockwise but is perferably counter-clockwise. In the preferred embodiment, cam follower 32 is positioned at the open end of crescent shaped rotor 30 and is effective for pushing and pulling slide 34 back and forth in groove 20. When slide 34 is fully extended, that is in the leftwardmost position as shown, the slide fits relatively snugly between two adjacent cam followers 48 thus preventing movement of disk 42. FIG. 4 shows an alternate slide which clutches only one cam follower. In the preferred embodiment the closed rear portion of rotor 30 is at this point snugly position between two adjacent cam followers 48 at the right side of FIG. 2. At this point the top portion of cam follower 32 is swinging through its arc within orifice 44. As shaft 26 rotates counter-clockwise, cam follower 32 moves downwardly in slot 38 and pulls the slide to the right disengaging it from cam followers 48. Simultaneously, rotor 30 turns such that the open portion of the crescent is at the 6 o'clock position thus freeing cam follower 48 to turn allowing disk 42 to turn when cam follower 32 engages one disk notch 46 and pushes it through one work station unit of arc before freeing itself into orifice 44 and pushing slide 34 leftward for the next cycle.

As will be clearly apparent to the skilled artisan, many modifications may be made to the described apparatus without departing from the scope of the invention. For example, motor 24 may actually comprise any means effective to turn rotor 30 and/or shaft 26 at any desired fixed or a variable speed. Rotor 30 provides locking engagement with cam followers 48, but need not necessarily do so. Slide 34 engages adjacent cam followers 48 but it can be provided with appropriate slotted clutch means such that it engages only one such cam follower. Drive disk 42 may be provided with any desired number of slotted work stations although from 8 to 24 are preferred. Also table top 50 and disk 42 may be separate parts which are attached as shown or may be integral with one another. In the preferred embodiment, the base is provided with an appropriate grease fitting, such as 60.

What is claimed:

1. A rotary indexing table which comprises a mounting base having an upper face defining a stationary plate, said plate having a recessed channel positioned at the upper face of said plate around its circumference, said plate further having a slide groove adapted for sliding engagement with a slide element, and further having a bore capable of cooperation with rotating means; a drive disk positioned over said plate, said disk having a central orifice therethrough and a plurality of notches radiating from said orifice and extending a distance spaced from the periphery thereof, a plurality of pins mounted at the underside of said disk, said pins being positioned and capable of translation in said plate channel; a slide element positioned in the slide groove of said plate, a first end of said slide positioned for periodic locking engagement and disengagement with at least one of said pins, a slot through said slide positioned at a second end thereof perpendicular to the longitudinal axis of said slide; rotating means for turning a rotor member which motor member is positioned through said plate bore; a projecting member adapted for revolution on said rotor member, said projecting member being positioned for translation in said slot of said slide and capable of sequentially engaging and disengaging adjacent disk notches to effect disk rotation.

2. The indexing table of claim 1 further comprising a generally planar table top member at the upper portion of said disk.

3. The indexing table of claim 1 wherein said rotating means comprises a motor.

4. The indexing table of claim 3 wherein said motor is a D.C. electric motor.

5. The indexing table of claim 1 further comprising switching means capable of inducing the activation of said rotating means.

6. The indexing table of claim 1 further comprising switching means capable of signaling the position of said disk.

7. The indexing table of claim 1 wherein said slide engages and disengages said disk between two adjacent pins.

8. The indexing table of claim 1 wherein said slide engages and disengages said disk by clutching one pin.

9. The indexing table of claim 1 wherein said pins are positioned between the periphery of said disk and an end of each of said notches.

10. The indexing table of claim 1 wherein said rotor is generally crescent shaped.

11. The indexing table of claim 1 wherein said rotor is capable of locking engagement and disengagement with two adjacent pins.

12. The indexing table of claim 10 wherein said rotor is capable of locking engagement and disengagement with two adjacent pins.

13. The indexing table of claim 1 wherein said rotor and said projecting member are mounted on a rotor support.

14. The indexing table of claim 11 wherein said projecting member is positioned at the open end of said crescent shaped rotor perpendicular to the plane containing the upper surface of said rotor.

15. The indexing table of claim 1 wherein said pins and said projecting member are cam followers.

16. A rotary indexing table which comprises a mounting base having an upper face defining a stationary plate, said plate having a central hub therethrough and a recessed channel positioned at the upper face of said plate around its circumference, said plate further having a slide groove adapted for sliding engagement with a slide element, and further having a bore capable of cooperation with rotating means; a drive disk positioned over said plate, said disk having a central orifice therethrough and a plurality of notches radiating from said orifice and extending a distance spaced from the periphery thereof, a plurality of cam followers mounted at the underside of said disk, said cam followers being positioned and capable of translation in said plate channel; a slide element positioned in the slide groove of said plate, said slide having a first slot therethrough parallel to its longitudinal axis and adapted to slide with said hub positioned therethrough, a first end of said slide positioned for periodic locking engagement and disengagement with at least one of said cam followers, a second slot through said slide positioned at a second end thereof perpendicular to and spaced from said first slot; rotating means comprising a rotating shaft mounted through said plate bore, a rotor member mounted for rotation by said shaft; a needle bearing adapted for revolution around said shaft, said needle bearing being positioned for translation in said second slot of said slide and capable of sequentially engaging and disengaging adjacent disk notches to effect disk rotation about said hub.

17. A rotary indexing table which comprises a mounting base having an upper face defining a stationary plate, said plate having a central hub therethrough and a recessed channel positioned at the upper face of said plate around its circumference said plate further having a slide groove adapted for sliding engagement with a slide element, and further having a bore capable of cooperation with rotating means; a drive disk positioned over said plate, said disk having a central orifice therethrough and a plurality of notches radiating from said orifice and extending a distance spaced from the periphery thereof, a plurality of cam followers mounted at the underside of said disk, said cam followers being positioned and capable of translation in said plate channel; an generally planar table-top member at the upper portion of said disk, a slide element positioned in the slide groove of said plate, said slide having a first slot therethrough parallel to its longitudinal axis and adapted to slide with said hub positioned therethrough, a first end of said slide positioned for periodic locking engagement and disengagement between two adjacent cam followers, a second slot through said slide positioned at a second end thereof perpendicular to and spaced from said first slot; a motor comprising a rotating shaft mounted through said plate bore, a generally crescent shaped rotor member mounted for rotation by said shaft; a needle bearing positioned on said rotor member at the open end of said crescent, perpendicular to the plane containing the upper surface of said rotor, and adapted for revolution around said shaft, said needle bearing being positioned for translation in said second slot of said slide and capable of sequentially engaging and disengaging adjacent disk notches to effect disk rotation about said hub; and switching means capable of signalling the position of said disk.

* * * * *